A. DAHLEN.
COMPUTING SCALE.
APPLICATION FILED OCT. 5, 1914.

1,175,899.

Patented Mar. 14, 1916.
3 SHEETS—SHEET 1.

Witnesses

Inventor
Andrew Dahlen,
By A. Miller Belfield, Atty.

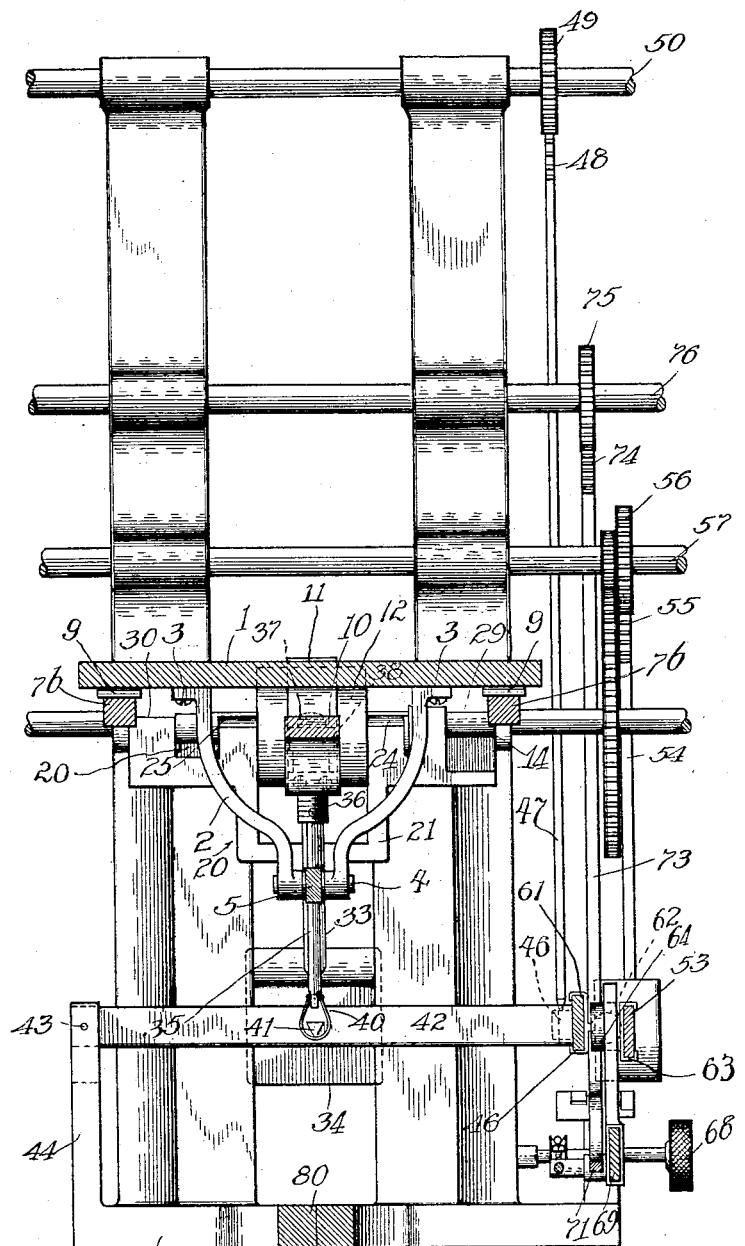

A. DAHLEN.
COMPUTING SCALE.
APPLICATION FILED OCT. 5, 1914.
1,175,899.
Patented Mar. 14, 1916.
3 SHEETS—SHEET 3.
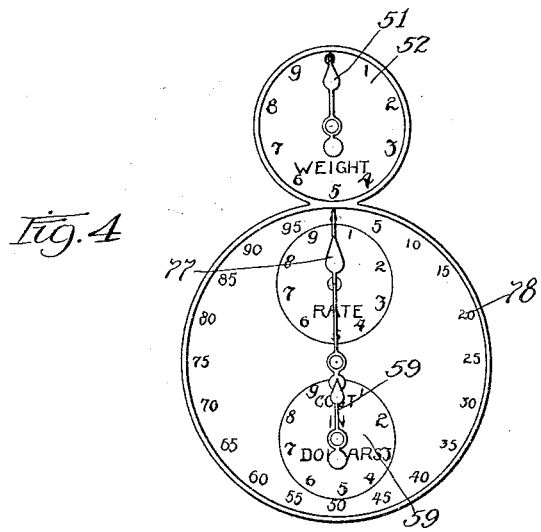
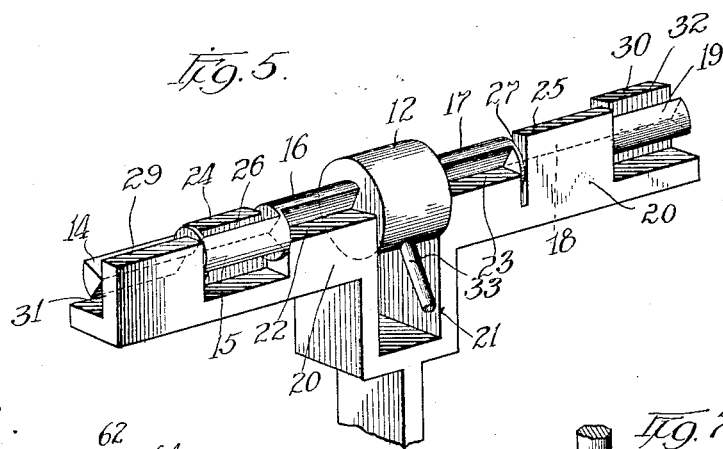
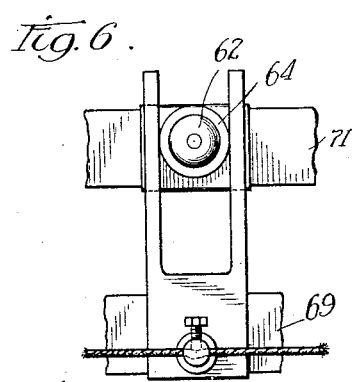
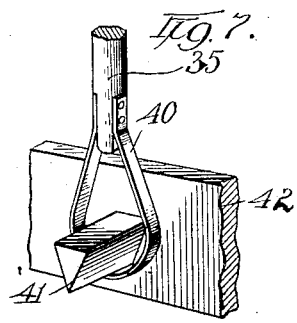
Inventor:
Andrew Dahlen

UNITED STATES PATENT OFFICE.

ANDREW DAHLEN, OF CHICAGO, ILLINOIS, ASSIGNOR OF ONE-HALF TO ERNST J. DAHLEN, OF CHICAGO, ILLINOIS.

COMPUTING-SCALE.

1,175,899.   Specification of Letters Patent.   Patented Mar. 14, 1916.

Application filed October 5, 1914. Serial No. 865,002.

*To all whom it may concern:*

Be it known that I, ANDREW DAHLEN, a citizen of the United States, residing at Chicago, in the county of Cook and State of Illinois, have invented a certain new and useful Improvement in Computing-Scales, of which the following is a full, clear, concise, and exact description, reference being had to the accompanying drawings, forming a part of this specification.

My invention relates to computing scales. Prominent objects of the invention are to provide a simple, practical and durable construction of computing scale; to arrange for the accurate and easy operation of the same; to permit the customer as well as the sales person to see the indication or computation of the scale; to arrange for the computation and indication by both the weight and the rate and the total cost; to simplify the construction and thereby reduce the cost or expense of manufacture and the reduction of weight of the device; and to secure the foregoing and other desirable results in a simple and expeditious manner.

Figure 1:
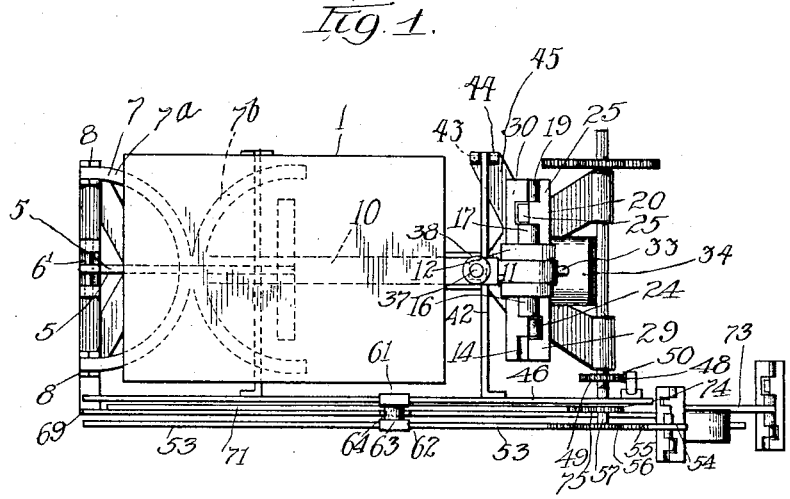
Figure 2:
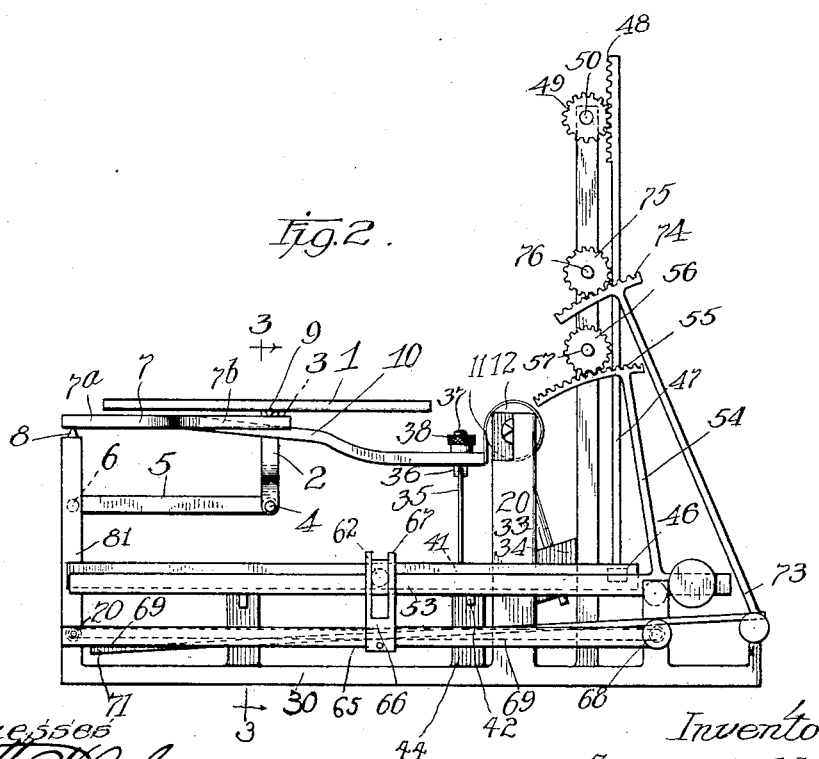

In the accompanying drawings Figure 1 is a plan view of a computing scale embodying my invention; Fig. 2 is a side elevation of the same; Fig. 3 is a vertical elevation taken on the line 3—3 in Fig. 2, on an enlarged scale; Fig. 4 is an elevation of the indicating dials; and Figs. 5, 6 and 7 are views of details of construction.

The scale is shown provided with a platform or pan 1, on which the article or object to be weighed and whose price is to be computed is to be placed. This receiving or weighing platform or pan 1 is mounted upon a yoke 2, being secured to the same by screws 3—3 (Figs. 2 and 3). The yoke 2 is pivotally secured at its lower end 4 to a bar or rod 5 which extends back to the rear of the scale and is pivotally mounted at 6. Immediately below the platform 1 is a supporting member 7 preferably formed of two bow-shaped members 7ª and 7ᵇ, as shown in Fig. 1. The rear bar 7ª is mounted upon knife edges 8—8 and the front bar 7ᵇ is also mounted upon knife edges 9—9, on the bottom of the scale platform 1. A central tongue or member 10 extends forwardly from said member 7, being conveniently made integral therewith, and is somewhat bent downwardly, as shown in Fig. 2. The end of this tongue member 10 is connected to a flexible strap 11 preferably made of metal, which strap is wound part way around a roller or cylinder 12, shown more in detail in Fig. 5. This cylinder or roller 12 is carried by knife edges 14, 15, 16, 17, 18 and 19. The knife edges 16 and 17 are next adjacent to the roller 12 and have their bearing edges downwardly, whereas the knife edges 15 and 18 are next outwardly and have their bearing edges at right angles to the bearing edges of the blades 16 and 17, and the edges 14 and 19 face oppositely to the edges 15 and 18, being at the ends of the bearing or carrying shaft provided by this set or series of knife edge blades. This arrangement rests upon a bearing member 20 having a central recess 21 for the roller 12 and flat horizontal bearing surfaces 22 and 23 for the knife blades 16 and 17, and also having vertical block members 24 and 25 with oppositely facing bearing surfaces 26 and 27 for the blades 15 and 18, respectively, and said member 20 also having other vertically arranged block members 29 and 30 with oppositely facing vertical bearing surfaces 31 and 32 for the blades 14 and 19, respectively. This bearing or supporting arrangement is obviously very sensitive and accurate and frictionless. The shaft device carrying the roller 12 and comprising the various knife blades described, also is provided with an arm 33, (Fig. 2), carrying a weight 34. By this arrangement it will be seen that the weight of any article placed on the scale 1 will cause a lowering of the arm 10 and a consequent turning of the roller 12 and upward-swinging movement of the weight 34. A rod 35 (Figs. 2 and 3), extends down from the end of the tongue member 10. This rod 35 is pivoted at its upper end to the end 36 of a bolt 37 which projects through the member 10 and is provided with a thumb nut 38, whereby said bolt 37 may be adjusted up and down. The lower end of the rod 35 carries a metal strap 40 which encircles a knife blade 41 carried by a cross bar 42. The latter is pivoted at 43 to a post 44 on the base 45 of the machine. The other or free swinging end of the bar 42 is secured to a longitudinally extending bar or rod 46 which I will call the weight-bar. The movement of the scale 1 up and down obviously produces a swinging movement of the bar 42 and thereby causes an actuation of the weight bar 46. An indicator rod 47 rests upon the right hand end (Fig. 2), of the bar 46 and is provided at its upper end with a rack portion 48. This rack 48 meshes with a pinion 49 on a shaft 50 which carries the pointer 51 of the weight dial 52 (Fig. 4), whereby the movement of the weight rod 46 actuates the weight pointer 51. There is another rod 53 extending alongside the weight rod 46, which rod 53 I will call the cost or value rod. This cost rod has an arm 54 having a rack segment 55 at its upper end meshing with a pinion 56 carried by a shaft 57 which also carries the cost pointer 58 of the cost dial 59.

The rods 46 and 53 have a jointed connection between them, preferably in the nature of a ball and socket joint, which I will now describe. The rod 46 carries a slidable sleeve 61 provided with a ball 62 and the rod 53 carries a slidable sleeve 63 provided with a socket 64 for the ball 62. This ball and socket connection permits an adjustment of the two rods 53 and 46. There is a guide rod 65 which carries a sliding fork 66, the arms of which 67 extend up and engage the socket 64, whereby said arms 67 may move the ball and socket connection between the rods 53 and 46 backwardly and forwardly longitudinally of said rods. A thumb wheel 68 is provided with a flexible connector 69 which extends to the fork 66 whereby said fork may be moved longitudinally on the rod 65, said flexible connector 69 also extending to a roller 70 on the machine frame. Another rod 71 which I will call the rate rod is arranged lengthwise of the machine and is provided with an arm 73 which is provided at its upper end with a rack segment 74 meshing with a pinion 75 on a shaft 76 which also carries the rate pointer 77 for the rate dial 78. An adjustment of the fork 66 causes the bar 71 to be raised and lowered and thereby causes an actuation of the rate wheel 75 and rate pointer 77.

The support 20 rises from the base 80, being preferably made integral therewith. At the left hand or rear end of said base 80 (Fig. 2), an upright member 81 is arranged and this carries the knife edges 8—8 on which the members 7ª rest. This member 81 is conveniently forked at its upper end, the two sides or arms of the fork providing the two supports for the bearings 8—8 (Fig. 1), and also being provided with upwardly extending lugs or fingers 83 between which a pin 6 is extended, said pin 6 forming the pivotal support for the rod or bar 5. This adjustment may be made so as to make the rate the proper amount, that is so that the rate pointer 77 will be adjusted to the rate of value, as for example the price per pound of the article. When this adjustment is made the relationship of the cost or value bar 53 with reference to the bar 46 will be such as to cause the operation of the value pointer 58 in accordance with the rate indicated by the pointer 77, and the weight indicated by the pointer 51, the design of the device being worked out so as to effect this result. For example, the upper or weight dial 52 may be arranged so as to indicate pounds and ounces, and the next dial 78 be arranged to indicate rate per pound, as for example 1½, 2, 2½, 3 3½, etc., cents or dollars per pound, and the lower dial 59 may be arranged to indicate cost in dollars and cents. In this way the entire operation of the machine may be indicated and seen, there being an automatic indication not only of the weight and the final cost, but also of the rate per pound or ounce, or other unit by means of which the final cost is reached. This is advantageous inasmuch as the entire transaction is indicated at once by a mere glance at the dials. If desired the dials may obviously be double-faced, so as to be seen not only by the salesman, but also by the purchaser.

It will be understood that changes and modifications may be made without departing from the spirit of the invention.

What I claim is:

1. A computing scale having dials for indicating weight rate and value, in combination with pointers for said dials, and means for actuating said weight and rate dials, the means for actuating said weight dial comprising mechanism operable by the weight of an article, said mechanism and the mechanism whereby the rate dial is operated including members which are pivoted transversely to each other.

2. A computing scale having dials for indicating weight, rate and value, in combination with pointers for said dials, and means for actuating said weight and value dials, said means comprising mechanism operable by the weight of an article, a rate dial, means for actuating said rate dial, said means and the mechanism which operates the value dial including members which are pivoted transversely to the member which operates the weight dial.

3. A computing scale having dials for indicating weight, rate and value, in combination with pointers for said dials, means for actuating said weight and value pointers, said means comprising mechanism operable by the weight of an article, the pointers for said weight and value dials being operated by members which are pivoted transverse to each other, a stationary member and means connecting said transversely pivoted members together, said means being movable upon said stationary member and constructed to change the point of connection between said members when moved.

4. A computing scale having dials for indicating weight, rate, and value in combination with pointers for said dials, and means for actuating said pointers, said means comprising mechanism operable by the weight of an article, the pointers for said rate and value dials being operated by members which are pivoted transverse to the member which operates the weight pointer, and means for changing the point of connection between said value and weight indicating mechanism.

5. The combination of a platform, a weight bar connected with said platform, and a value bar having a pivotal connection with said weight bar, said bars being pivoted transverse to each other, said pivotal connection being longitudinally adjustable along said bars.

6. The combination of a platform, a weight bar connected with said platform, and a value bar having a pivotal connection with said weight bar, said bars being pivoted transverse to each other, said pivotal connection being longitudinally adjustable along said bars, and weight and value indicating mechanisms actuated respectively by said bars.

7. The combination of a scale platform, a weight bar connected with said platform, a value bar arranged lengthwise of said weight bar, a ball and socket connection one part of which is slidably mounted on said weight bar, and the other part of which is slidably mounted on said value bar, a device for engaging said ball and socket connection and moving the same along said bars, and means for moving said device.

8. The combination of a scale platform, a weight bar connected with said platform, a value bar arranged lengthwise of said weight bar, a ball and socket connection one part of which is slidably mounted on said weight bar, and the other part of which is slidably mounted on said value bar, a device for engaging said ball and socket connection and moving the same along said bars, and means for moving said device, said device comprising a forked slide and the longitudinal bar on which said slide is movably mounted, and a flexible connector connected with said slide.

9. The combination of a scale platform, a weight bar connected with said platform, a value bar arranged lengthwise of said weight bar, a ball and socket connection one part of which is slidably mounted on said weight bar and the other part of which is slidably mounted on said value bar, a device for engaging said ball and socket connection and moving the same along said bars, means for moving said device, and a rate bar actuated by said device.

10. The combination of a scale platform, a weight bar connected with said platform, a value bar arranged lengthwise of said weight bar, a ball and socket connection one part of which is slidably mounted on said weight-bar and the other part of which is slidably mounted on said value bar, a device for engaging said ball and socket connection and moving the same along said bars, means for moving said device, and indicators for indicating weight value and rate, together with mechanism whereby said indicators are respectively actuated by said bars.

11. The combination of a scale platform, a weight bar connected with said platform, a value bar arranged lengthwise of said weight bar, a ball and socket connection one part of which is slidably mounted on said weight bar and the other part of which is slidably mounted on said value bar, a device for engaging said ball and socket connection and moving the same along said bars, means for moving said device, and indicators for indicating weight value and rate, together with mechanism whereby said indicators are respectively actuated by said bars, said indicators comprising dials and pointers, and said mechanism comprising rods provided with toothed segments and pinions mounted on shafts carrying said indicators, said pinions gearing with said segments.

12. In a computing scale, the combination with the scale platform of a rotary member connected for rotary movement by said platform, said rotary member having knife edge bearings arranged at different angles, and bearing surfaces coöperating with said knife edge bearings, said knife edge bearings pointing downwardly and also in opposite directions, horizontally, and said bearing surfaces facing accordingly.

13. The combination with the scale platform of an arm carried thereby, a flexible strap secured to the end of said arm, a rotary member having a roller from which said strap is extended, said rotary member also having downwardly and horizontally pointing knife edge bearings, and a supporting member having horizontal and vertical bearing surfaces for said knife edge bearings.

14. The combination with the scale platform of an arm carried thereby, a flexible strap secured to the end of said arm, a rotary member having a roller from which said strap is extended, said rotary member also having downwardly and horizontally pointing knife edge bearings, and a supporting member having horizontal and vertical bearing surfaces for said knife edge bearings, said supporting member being constructed as part of the form of the machine and having a recess for said roller.

15. The combination with the scale platform of an arm carried thereby, a connection for said arm comprising a bolt 37 passing through said arm, a thumb nut 38 above said arm, a rod 35 pivotally connected with the lower end of said bolt, a band or strap 40 at the lower end of the arm 35, and a pivoted bar 42 having a knife edge projection 41 inclosed within and engaging said strap 40.

16. The combination with the scale platform of an arm carried thereby, a connection for said arm comprising a bolt 37 passing through said arm, a thumb nut 38 above said arm, a rod 35 pivotally connected with the lower end of said bolt, a band or strap 40 at the lower end of the arm 35, and a pivoted bar 42 having a knife edge projection 41 inclosed within and engaging said strap 40, and a weight indicator actuated by said bar 42.

17. A computing scale comprising in combination, weight, rate, and value dials, and pointers therefor, means for actuating said pointers comprising a platform for an article, connections with said platform, said connections being pivoted transversely to each other and one of said connections having a member which moves in a plane which is parallel to the movement of the other member, a member connecting said last mentioned members, and being movable along said members, and operating to actuate one of said pointers when moved along said members.

18. A computing scale comprising in combination, weight, rate, and value dials, pointers therefor, and means for actuating said pointers comprising a platform for an article and connections therewith, a member attached to a pair of said connections and movable thereon, said member being constructed to permit said connections to move in relatively different planes, and the movement of said member actuating one of said pointers.

19. A computing scale comprising in combination, weight, rate and value dials, and pointers therefor, means for actuating said pointers comprising a platform for an article and members connected therewith which operate in planes which are transverse to each other, a member connecting said transversely movable members whereby relatively different amounts are indicated upon said dials upon operation of said platform, the construction of said connecting member permitting the operation of said platform without affecting the pointer of one of the dials.

20. A computing scale comprising in combination, weight, and value dials and pointers therefor, means for actuating said pointers comprising a platform for an article and members connected therewith which operate in planes which are transverse to each other, a member connecting said transversely movable members, whereby relatively different amounts are indicated upon said dials upon operation of said platform.

In witness whereof, I hereunto subscribe my name this 26th day of September A. D., 1914.

ANDREW DAHLEN.

Witnesses:
A. LYDA JONES,
HAZEL A. JONES.

Copies of this patent may be obtained for five cents each, by addressing the "Commissioner of Patents, Washington, D. C."